United States Patent [19]

Moffett, Jr.

[11] 4,161,085
[45] Jul. 17, 1979

[54] GARDEN DEVICE AND METHOD OF PRODUCING SAME

[76] Inventor: F. Wesley Moffett, Jr., 944 Allens Creek Rd., Rochester, N.Y. 14618

[21] Appl. No.: 888,350

[22] Filed: Mar. 20, 1978

[51] Int. Cl.² .............................................. A01G 9/021
[52] U.S. Cl. ................................................. 47/82; 47/67
[58] Field of Search ................... 47/59, 63, 64, 66–67, 47/79, 82, 83, 56, 84, 65, 33

[56] References Cited

U.S. PATENT DOCUMENTS

| 297,932 | 4/1884 | Groves et al. | 47/82 |
| 1,752,597 | 4/1930 | Jackson | 47/82 |
| 2,152,869 | 4/1939 | Campbell | 47/82 |
| 2,309,702 | 2/1943 | Kirschenbaum | 47/56 |
| 3,362,106 | 1/1968 | Goldring | 47/56 |
| 3,394,495 | 7/1968 | Mills | 47/83 |
| 3,667,157 | 6/1972 | Loughini | 47/82 X |
| 4,034,508 | 7/1977 | Dedolph | 47/84 |
| 4,035,950 | 7/1977 | Anselm | 47/59 |
| 4,065,876 | 1/1978 | Moffett | 47/83 |

FOREIGN PATENT DOCUMENTS

| 194182 | 3/1957 | Austria | 47/63 |
| 922106 | 3/1973 | Canada | 47/79 |
| 944153 | 3/1974 | Canada | 47/65 |
| 2253451 | 7/1975 | France | 47/83 |
| 2314659 | 1/1977 | France | 47/59 |
| 416200 | 1/1967 | Switzerland | 47/63 |

*Primary Examiner*—Robert E. Bagwill
*Attorney, Agent, or Firm*—Cumpston & Shaw

[57] ABSTRACT

An improved garden device for producing a vertically oriented garden. The garden device comprises a flexible sheet of plastic or the like having plant perforations or openings extending therethrough. The sheet when vertically arranged forms a vertically extending first endless wall enclosure of varying cross section for receiving a quantity of growing medium such as soil. A cover slip is releasably attached to each perforation for covering the perforation to prevent the escape of soil and moisture from the enclosure. The cover slip is detachable from the perforation to allow the embedding in the soil of a seed or plant for growth through the perforation. A second endless wall enclosure similar to the first enclosure is mountable in vertical registry with the first enclosure and secured thereto by strip weaving or by a plurality of connecting slips. A watering member is placed in the soil adjacent the upper end of the uppermost enclosure for watering the soil. The uppermost enclosure is preferably provided with a cover, and the lowermost enclosure is preferably mounted on a bottom support member.

18 Claims, 10 Drawing Figures

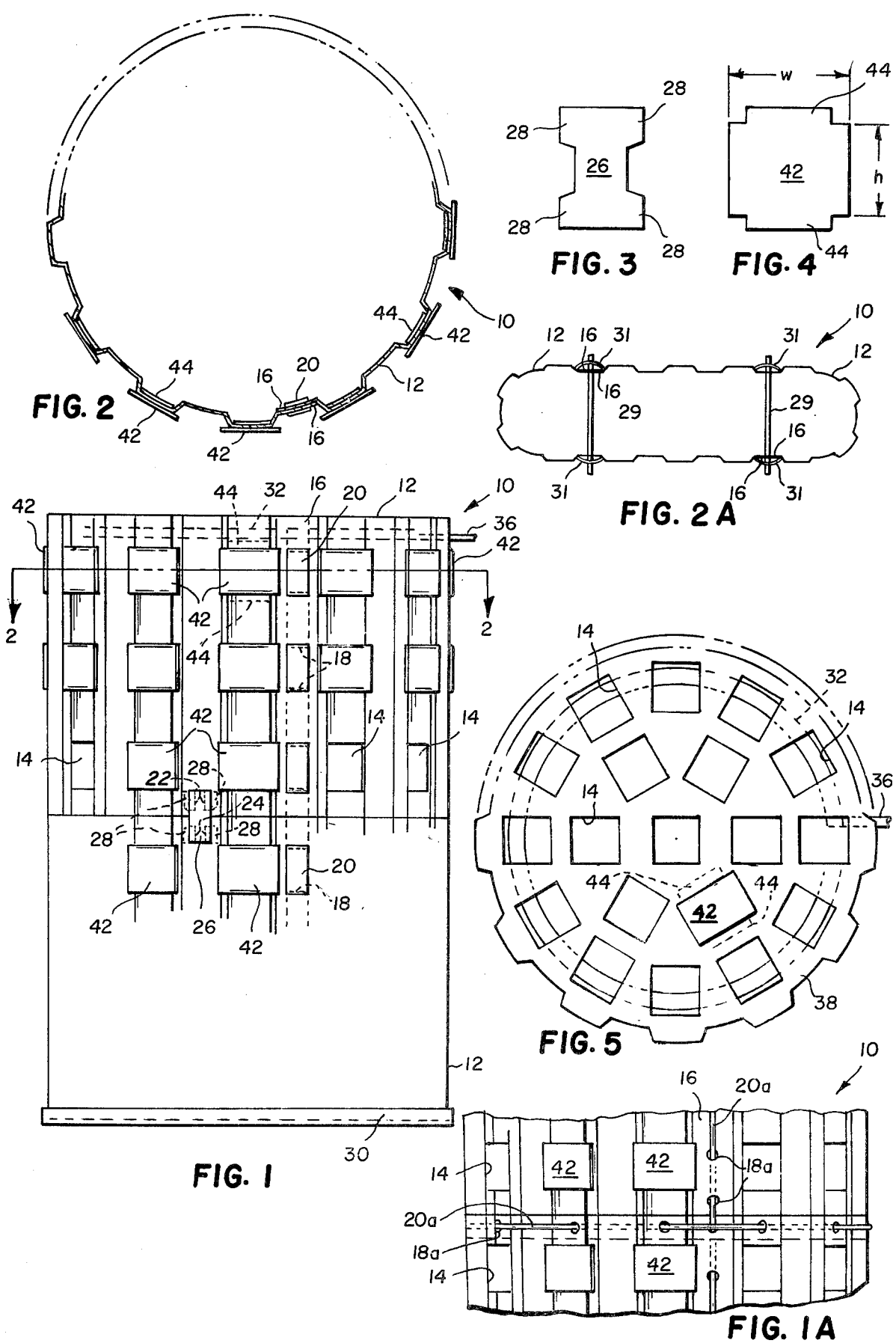

GARDEN DEVICE AND METHOD OF PRODUCING SAME

BACKGROUND OF THE INVENTION

1. Field of the Invention

This invention relates generally to garden devices, and more specifically to an improved vertical garden device for producing a vertically oriented garden, and method of producing same.

2. Description of the Prior Art

Garden devices for producing vertically oriented gardens are generally well known in the art of which U.S. Pat. Nos. 297,932; 1,752,597 and French Pat. No. 2,253,451 are exemplary.

U.S. Pat. No. 297,932 discloses a garden device comprising an enclosure such as a rigid tank, barrel or other vessel containing soil and having holes extending through the sides thereof through which plants are grown. A disadvantage of this garden device is that the walls of the enclosure are rigid. Consequently, the outer configuration or contours of the enclosure is fixed and cannot be altered to vary the size or shape of the enclosure for any desired reason. For example, it may be desirable to have a substantially L-shaped enclosure that can be built around a corner of an object such as a building.

U.S. and French Pat. Nos. 1,752,597 and 2,253,451 respectively teach garden devices comprising screened enclosures containing soil. Plants are grown through the openings in the screen. The French patent further teaches interposing a perforated plastic sheeting between the screen and soil. Although the screen is flexible to a degree, the size or shape of a screen enclosure cannot be altered without considerable difficulty. Supports such as brackets or posts must be mounted in the ground and properly positioned to support the screen in the desired contour or shape. Once positioned, such supports cannot be changed without considerable difficulty. Means must be provided to place the screen on the supports and to secure the screen thereto. In addition, the screen must be purchased in rolls, and when used, unrolled and cut by wire clippers. The cut ends of the screen can inflict injury to persons erecting, planting and caring for the garden.

SUMMARY OF THE INVENTION

In accordance with preferred embodiments of this invention, improved garden devices and methods of producing same are disclosed. These garden devices are extremely versatile, and can be readily formed into various sizes and shapes.

Essentially, the garden devices comprise a flexible sheet of plastic or the like vertically arranged to form at least a part of a vertically extending first endless wall enclosure for receiving a quantity of growing medium such as soil. The plastic sheet is provided with vertically spaced plant openings or perforations. A cover slip is releasably attached to each perforation for covering the perforation to prevent the escape of soil and moisture from the first enclosure. The cover slip can be detached from the perforation to allow the embedding in the soil of a seed or plant for growth through the perforation. One or more endless wall enclosures similar to the first enclosure are mountable in registry on the first enclosure in piggy-back fashion and secured thereto by weaving a strip through overlapped ends thereof, or by a plurality of connecting slips. A watering member is preferably placed on or embedded in the soil adjacent the upper end of the uppermost enclosure for watering the soil. A cover may be provided for the upper end of the uppermost enclosure, and a bottom support member for supporting the lower end of the lowermost enclosure. The bottom member further protects the soil from invasion by insects, and contamination by fungus, bacteria and the like.

One of the advantages of Applicant's garden device is that the parts thereof such as the wall sheets, cover, bottom, and connecting members are all flexible and interfitting for ease in stacking, packaging, and handling. No sharp edges are presented that could cause injury to anyone handling or assembling the parts. In addition, due to the flexibility of the wall sheets, the endless wall enclosure can be arranged in any desired shape or contour such as circular, substantially rectangular, ellipsoidal, L-shaped, irregular or free form.

In a more specific aspect of the invention, the cover slip has means comprising laterally extending flaps. The flaps, when squeezed together, are insertable from the outer side of the sheet through corresponding perforations in the sheet. When the flaps are released, they engage the inner side of the sheet for releasably attaching the slip to the sheet in a position covering the perforation.

In one aspect of the invention, the securing means for securing together adjacent ends of sheets arranged vertically or horizontally comprises overlapping the adjacent ends. A flexible strip or rod is woven through spaced apart openings extending through the overlapped ends.

In another aspect of the invention, the securing means for securing together adjacent ends of sheets arranged vertically or horizontally comprises a first pair of spaced slots along an edge of one sheet. A complementary second pair of spaced slots are provided in registry along the adjacent edge of another sheet. A connecting slip is provided having one pair of laterally extending flaps adapted to be squeezed and inserted into the first pair of slots. Another pair of laterally extending flaps on the connecting slip are squeezed and inserted into the second pair of slots.

In a further aspect of the invention, the flexible enclosure is held in a non-circular position such as long and narrow by flexible plastic tie rods. The tie rods extend through opposite walls of the enclosure, and spring clips are secured to opposite ends of the tie rods for the walls a given distance apart. The tie rods can also be used to secure overlapped ends of adjacent sheets together.

The invention and its advantages will become more apparent from the detailed description of the preferred embodiments presented below.

BRIEF DESCRIPTION OF THE DRAWING

In the detailed description of the preferred embodiments of the invention presented below, reference is made to the accompanying drawings, in which:

FIG. 1 is a side elevational view of a vertically extending garden device formed by one or more flexible sheets having vertically spaced plant perforations. The sheets are joined together on side ends to form lower and upper endless wall enclosures having top and bottom ends which are joined together. Some of the perforations in the enclosures are uncovered and some covered;

FIG. 1a is a segmental view similar to FIG. 1 showing different means for securing the sheet ends together, and means for joining upper and lower enclosures together;

FIG. 2 is a section view taken substantially along line 2—2 of FIG. 1;

FIG. 2a is a schematic top plan view of FIG. 1a illustrating means for maintaining opposed wall portions a given distance apart;

FIG. 3 is an enlarged top plan view of one of the connecting slips for securing the lower and upper enclosures of FIG. 1 together;

FIG. 4 is an enlarged top plan view of one of the cover slips for covering a perforation;

FIG. 5 is a top plan view of the garden device of FIG. 1 with one perforation covered and the remaining perforations uncovered;

DESCRIPTION OF THE PREFERRED EMBODIMENTS

Figure 6:
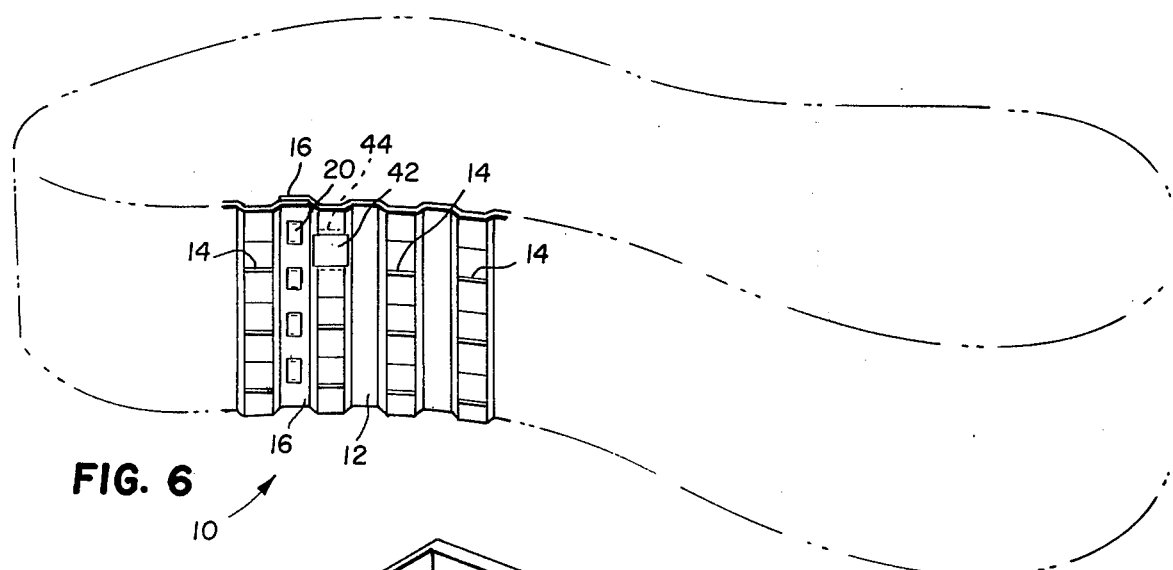
FIG. 6 is a perspective view of another embodiment of the endless wall enclosure of this invention.

With reference to FIGS. 1, 1a, 2 and 2a, preferred embodiments of the garden device of this invention are disclosed comprising one or more vertically extending flexible endless wall enclosures 10. The enclosures 10 are of cylindrical configuration in FIGS. 1 and 2, and preferably of a non-circular configuration in FIGS. 1a and 2a, such as elongated or ellipsoidal. The flexible wall of each enclosure 10 is formed of one or more rectangular flexible wall sheets 12 vertically arranged and connected together. Each sheet contains vertically spaced plant openings or perforations 14 to allow access to a growing medium such as soil or compost placed in the enclosure as explained hereinafter. The sheets 12 are preferably corrugated to add rigidity to the sheets, and to present jutting portions in which perforations 14 are located. The sheets 12 have overlapping ends 16 joined together by joining means into an endless wall of cylindrical configuration (FIGS. 1 and 2) or a preferred elongated, non-cylindrical configuration (FIGS. 1a and 2a). In FIGS. 1 and 2, the joining means comprise spaced, opposed slots 18 in the overlapping ends through which a flexible plastic strip 20 is woven with alternate portions thereof adjacent inner and outer sides of sheet ends 16. In FIGS. 1a and 2a, the joining means comprises small round openings 18a extending through the overlapped ends 16 through which a flexible plastic rod 20a or tube is woven.

If desired, a plurality of upper vertically extending enclosures 10 substantially identical to the lowermost enclosure can be mounted thereon in register in piggyback fashion. The lower and upper enclosures 10 are secured together by one type of securing means as best seen in FIGS. 1 and 3. This type of securing means comprises a first pair of spaced slots 22 along the upper edge of the lower enclosure, and a complementary second pair of spaced opposed slots 24 along the lower edge of the upper enclosure. The securing means further comprises a connecting slip 26 (FIG. 3) having two pairs of laterally extending flaps 28. One pair of flaps are squeezed together and inserted through the first pair of slots 22 from the outer side of the enclosure. The other pair of flaps are squeezed together and inserted in the same manner through the second pair of slots 24. When released, the flaps 28 return to their original expanded position into engagement with the inner surface of the enclosure.

Another type of securing means for securing the upper and lower enclosures together is disclosed in FIGS. 1a and 2a. In this embodiment, the ends of the upper and lower enclosures are slightly overlapped. The securing means for the overlapped ends is identical to the joining means 18a, 20a, and comprises similar small round openings 18a extending through the overlapped ends through which flexible plastic tubing 20a is woven.

The vertically extending flexible elongated endless wall enclosures 10, due to the flexibility of wall sheets 12, can be arranged into any suitable cross sectional shape or configuration such as circular (FIGS. 1 and 2), substantially rectangular (FIGS. 1a and 2a), irregular, free form and the like. The ellipsoidal or substantially rectangular shape can be obtained by the opposite walls a given distance apart by cross ties 29 or tie rods extending through opposite walls of the enclosure and secured to the outer surfaces thereof, preferably by stop means, such as spring clips 31 of the Tinnerman (trade mark) type. The tie rods 29 can also be used to secure together overlapped ends of adjacent sheets. When a long vertically extending enclosure 10 is constructed, steel posts are preferably driven in the ground, and opposite walls of the enclosure are secured to the posts by any suitable means.

The lowermost enclosure 10 is vertically oriented with the lower end thereof preferably nesting within a cup-shaped bottom support member 30 (FIG. 1) of the same configuration as the enclosure. The aforementioned soil or compost suitable for growing plants and enriched with fertilizer is placed in the enclosures 10 until they are filled substantially to the top of the uppermost enclosure. It is noted that enclosures of the elongated substantially rectangular or oval shape do not require as much soil as cylindrical enclosures having the same wall length, while still having the same number of openings for plants.

A fertilizer trickle watering device or soaker 32 (FIGS. 1 and 5) preferably comprising a perforated tube bent into a circular configuration is placed on top or embedded in the soil adjacent the upper end of the soil. The tube is closed at one end, and its other end 36 extends through one of the perforations and is secured to a water hose or other source of water.

With the vertical garden produced by Applicant's garden device, less fertilizer is used than on conventional farms because the fertilizer is not washed away, but rather is retained by the walls and bottom of the enclosure and eventually used. Similarly, less water is used than on conventional farms because the water does not leak out at the sides or bottom. Also, more crops per acre can be grown than in conventional level farming because there is greater growing area, and no space is required on a vertical garden for walkways or paths.

A cover member 38 (FIG. 5) having an outer periphery complementary to and preferably insertable within the inner periphery of the enclosure is placed on top of the soil to form a totally enclosed enclosure. The cover is preferably provided with perforations similar to perforations 14, but possibly of a different size to provide access to the soil therebelow.

To prevent the soil and moisture contained therein from escaping from the enclosures 10 through the perforations 14 in the walls (sides and/or ends) of the enclosures and top of the uppermost enclosure, cover slips 42 are provided for covering the perforations. Each cover slip 42 (see FIG. 4) has a cover portion having a height "h" substantially equal to the height of a complementary perforation 14, and a width "w" slightly wider than the width of a perforation. Each cover slip 42 further has laterally extending flaps 44 of a width slightly less than the width of a complementary perforation. Each cover slip 42 is releasably attached to the sheets 12 by squeezing the flaps 44 toward one another, inserting them from the outer side of the sheet through a complementary perforation 14 in the sheet, and releasing them causing the flaps 44 to engage the inner side of the sheet.

Prior to the introduction of soil into enclosure 10, all of the perforations 14 are preferably covered by cover slips 42. When it is desired to plant seeds or a plant, the desired number of cover slips 42 are removed from the wall sheets 12 and cover 38, (one or both sides, ends and top) and the seeds or plants inserted by any suitable means into the soil behind the perforations 14. For best results, any seeds planted should be planted near the front of the perforation so that the seedlings can easily pass through the perforation and out of the enclosure into the air and sunlight. At the end of the growing season, the plant stems are cut off, the cover slips 42 replaced, and the plant root material allowed to rot in place enriching the soil.

In the embodiment of the invention illustrated in FIG. 6, parts similar to previously mentioned parts will be denoted by the same numerals. This enclosure 10 is arranged in a non-cylindrical configuration on top of the ground which forms the bottom of the enclosure. Due to the flexibility of the perforated sheets 12, and their varying widths, they can be readily joined together and arranged in any desired configuration. Such enclosures 10 can be provided with bottom and cover members, not shown, having outer peripheries complementary to the configurations of the enclosures. Such enclosures can also be used for other uses such as storage bins, animal pens, or the like.

Figure 7:
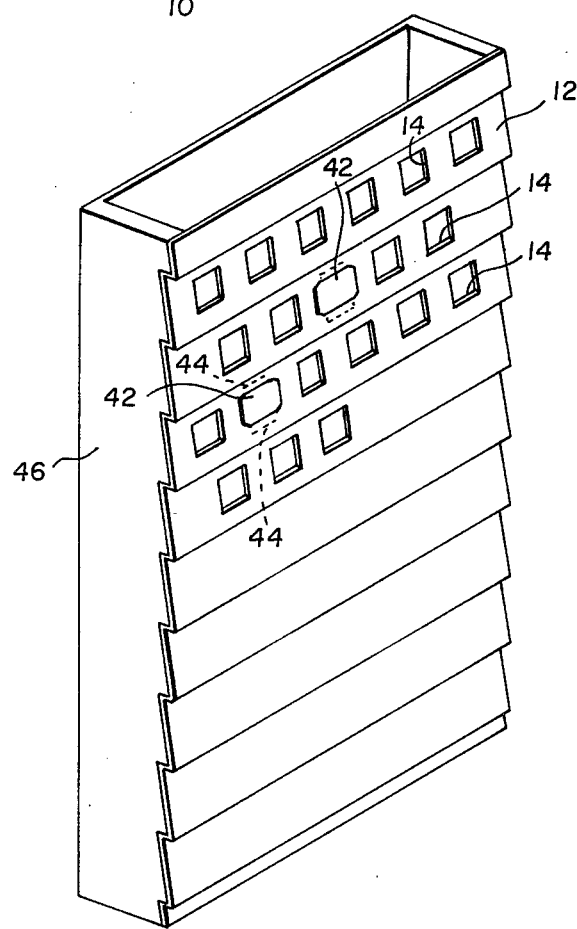
FIG. 7 is a perspective view of still another embodiment of the invention.

In the embodiment of the invention illustrated in FIG. 7, parts similar to previously mentioned parts will be denoted by the same numerals. The disclosed enclosure 10 is of a rectangular configuration with end walls 46 thereof comprising flat plates, only one of which is visible. At least one of the side walls 48 is formed from one or more perforated sheets 12 secured to the end walls by nailing or the like. The side walls 48 may be constructed to look like clapboards so that they will blend into the sides of a house. Such rectangular gardens can be hung on walls, and balcony rails or the like of a house.

Figure 8:
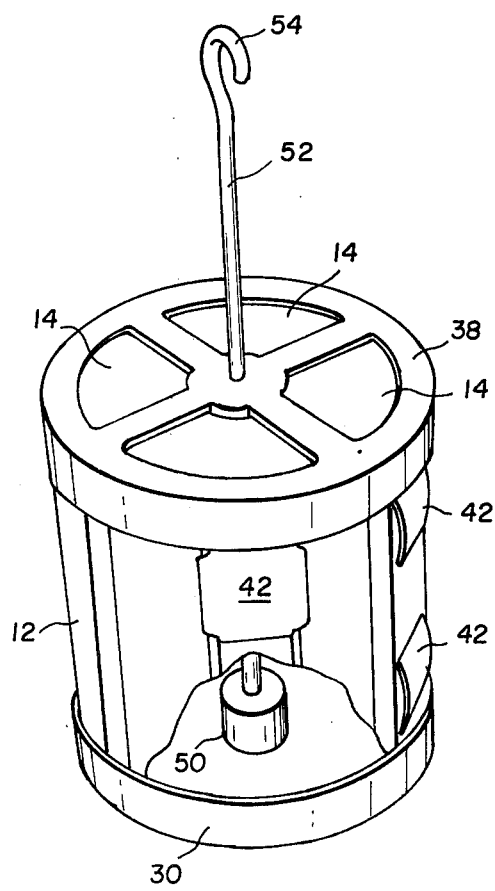
FIG. 8 is an exploded perspective view of still another embodiment of the invention for use as a plant hanger.

In the embodiment of the invention illustrated in FIG. 8, a house plant garden is illustrated in which parts similar to previously mentioned parts will be denoted by the same numbers. The plant garden comprises a cylindrical enclosure 10 similar to the enclosures described in relation to the embodiment of the invention of FIGS. 1-5. The enclosure may also be formed from a single sheet having depending fingers, not shown, along one and engageable in corresponding slits along the opposite end. The bottom member 30 may be a plastic disc, now shown, secured to the bottom of enclosure 10 by tape. If this is done, the house plant may be hung by string or macrame attached to openings at the upper end of the enclosure. In another form as shown in FIG. 8, the bottom member 30 is cup-shaped and has a central boss 50 with an internally threaded blind bore. The cover member 38 is also cup-shaped and has a central opening through which a hanger member such as a rod 52 extends. The rod has a threaded end for threadingly engaging the threaded bore, and a hook 54 at its other end by which the garden may be hung. The cover member 38 further has a plurality of perforations 14 of any suitable configuration through which the garden may be watered or planted.

The invention has been described in detail with particular reference to preferred embodiments, but it will be understood that variations and modifications can be effected within the spirit and scope of the invention as described hereinabove.

What is claimed is:

1. A garden device for producing a vertically oriented garden comprising:
   a first vertically extending endless wall enclosure for receiving a quantity of growing medium, said first wall enclosure comprising a vertically oriented flexible sheet having vertically spaced plant openings extending therethrough; and
   a flexible cover slip for releasably covering each plant opening, each of said cover slips having means for releasably attaching said slip to said sheet for covering one of said plant openings to prevent the escape of the growing medium and moisture contained therein from said enclosure, and detaching said slip from said sheet to permit access to the growing medium through said one plant opening whereby a seed or plant may be embedded in the growing medium for growth through said one plant opening.

2. The garden device according to claim 1 wherein each of said cover slips is non-porous and said attaching and detaching means of each cover slip comprises laterally extending flaps on said cover slip adapted when squeezed together to be insertable through said one plant opening from the outer side of said sheet, and when released to engage the inner side of said sheet for releasably attaching said slip to said sheet.

3. The garden device of claim 1 wherein said first endless wall enclosure is substantially cylindrical, and means are provided for maintaining opposite portions of said wall enclosure a given distance apart to form a noncylindrical wall enclosure.

4. The garden device according to claim 3 wherein said maintaining means comprises cross ties extending through said opposite portions, and stop means on the ends of said cross ties engaging the outer surface of said wall enclosure.

5. The garden device of claim 4 wherein said stop means comprises spring clips.

6. The garden device of claim 1 wherein said flexible sheet is rectangular, and means are provided for joining the ends of said rectangular sheet.

7. The garden device of claim 6 wherein said joining means comprises vertically spaced opposed strip openings in overlapping ends of said sheet, and a flexible strip adapted to be woven through said strip openings.

8. The garden device of claim 1 wherein a second wall enclosure is provided similar to said first wall enclosure and vertically positioned in registry with said first wall enclosure, and means are provided for securing said first and second wall enclosures together.

9. The garden device of claim 8 wherein said securing means comprises one or more first pairs of spaced slots along the upper edge of said first wall enclosure, and one or more complementary second pairs of spaced opposed slots along the lower edge of said second wall enclosure and vertically spaced from said first pairs of slots, and a connecting slip for each first and second pair of slots, said slip having two pairs of laterally extending flaps, of which one pair of flaps is insertable through said first pair of slots and the other pair of flaps is insertable through said second pair of slots.

10. The garden device of claim 8 wherein said securing means comprises a series of spaced opposed strip openings in registry in overlapping ends of said first and second wall enclosures, and a flexible strip adapted to be woven through said strip openings.

11. The garden device of claim 1 wherein said first wall enclosure comprises at least one flexible rectangular sheet, said garden device further comprising joining means for joining the ends of said vertically oriented sheet to form said first wall enclosure having an upper open end, said joining means comprising spaced, opposed strip openings in registry in overlapping ends of said sheet, and a strip adapted to be woven through said strip openings, said attaching and detaching means of each cover slip comprises laterally extending flaps on said cover slip adapted when squeezed together to be insertable through said one plant opening from the outer side of said sheet, and when released to engage the inner side of said sheet for releasably attaching said slip to said sheet, said garden device further comprising a perforated watering member in the growing medium adjacent said upper end of said first wall enclosure and having one end of said member extending externally of said first wall enclosure for connection to a water supply for watering the growing medium, and cover means for covering said upper open end of said first wall enclosure.

12. The garden device according to claim 11 wherein a second wall enclosure is provided similar to said first wall enclosure and positioned in vertical register with said first wall enclosure, and means are provided for securing said first and second wall enclosures together.

13. A method for producing a vertical garden comprising the steps of:
forming a vertically extending first wall enclosure out of at least one flexible sheet containing vertically spaced plant openings, said first enclosure having upper and lower open ends;
covering each of said plant openings with a cover slip which is detachable therefrom to uncover said plant opening
filling said first wall enclosure with growing medium through said upper open end;
detaching a cover slip from a plant opening to expose the growing medium; and
embedding a plant seed or plant in the exposed growing medium for growth through said plant opening.

14. The method of claim 13 comprising the further step of placing in the growing medium adjacent said upper open end a perforated member having an open end connected to a water supply for watering the growing medium.

15. The method of claim 13 comprising the further steps of securing a second wall enclosure similar to said first wall enclosure in vertical registry with said first wall enclosure; filling said second wall enclosure with growing medium; placing in the growing medium adjacent the upper open end of said second wall enclosure a perforated member having an open end connected to a water supply; and placing a cover member containing plant openings on said upper open end of said second wall enclosure.

16. The method of claim 13 comprising the further steps of mounting said first wall enclosure prior to said growing medium filling step onto a bottom support plate; placing in the growing medium adjacent the upper open end a perforated member having an open end connected to a water supply; and placing a cover member on said upper open end of said first wall enclosure.

17. The method according to claim 13 comprising the further steps of mounting said first wall enclosure prior to said growing medium filling step onto a bottom support member; and supporting said first wall enclosure and support member in a hanging position.

18. The method according to claim 13 comprising the further steps of mounting said first wall enclosure prior to said growing medium filling step onto a bottom support plate having a central bore; placing a cover member having a central opening on said upper open end of said first wall enclosure; inserting one end of a hanger member through said central opening and into said bore for securing said one end to said bottom support plate; and securing the opposite end of said hanger member to a fixed support for holding said first wall enclosure and support plate in a hanging position.

* * * * *